Sept. 17, 1929.　　　A. LANGSNER　　　1,728,893
LEVELING ROD CLAMP AND PROCESS OF FORMING SAME
Filed Nov. 30, 1927
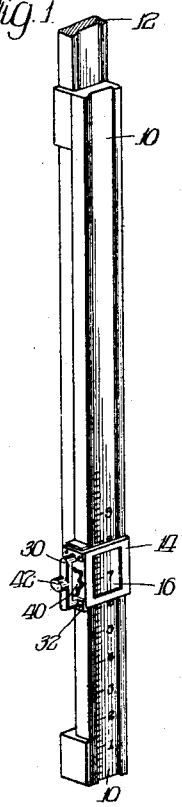
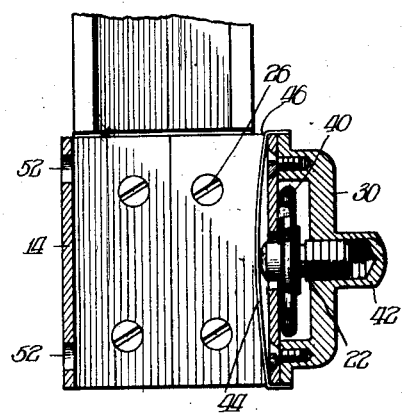
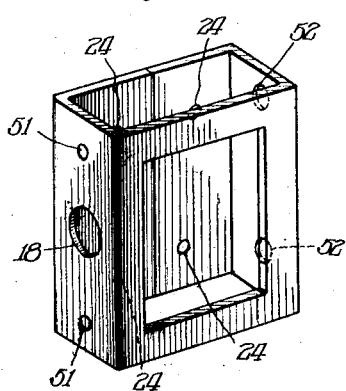
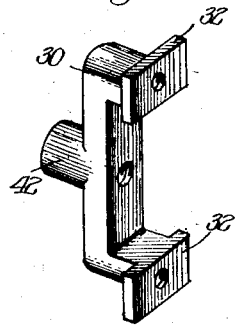
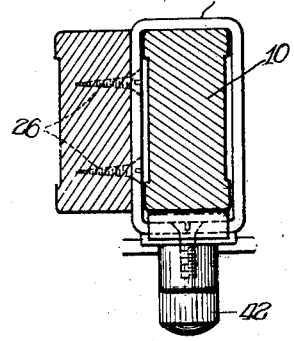
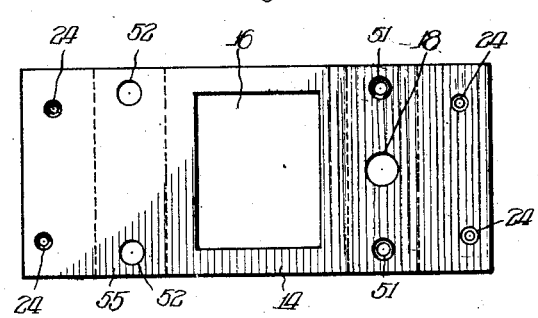
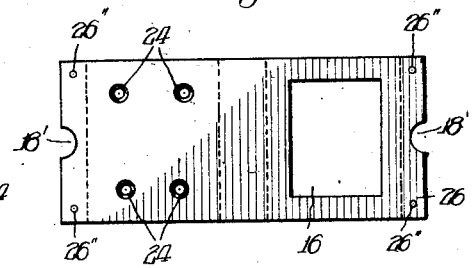
Inventor:
Adolph Langsner,
By Cheever & Cox attys.

Patented Sept. 17, 1929

1,728,893

UNITED STATES PATENT OFFICE

ADOLPH LANGSNER, OF CHICAGO, ILLINOIS, ASSIGNOR TO EUGENE DIETZGEN COMPANY, OF CHICAGO, ILLINOIS, A CORPORATION OF DELAWARE

LEVELING-ROD CLAMP AND PROCESS OF FORMING SAME

Application filed November 30, 1927. Serial No. 236,746.

My invention relates to clamps for leveling rods used by surveyors and others, especially to that type of rod composed of two sections whereby the rod may be extended in length, the clamp serving to hold the two rod sections in various positions of adjustment.

One of the objects of my invention is to provide a simple and economical type of clamp wherein the frame thereof is formed of sheet metal and preferably of a sheet metal stamping bent into a sleeve-like form and upon which is rigidly mounted a metal yoke carrying the clamping screw which holds the rod sections in adjusted position.

Another object of my present invention resides in the manner of constructing the sheet metal sleeve or frame from sheet metal and in the provision of the apertures therein through which the scale markings may be viewed and in the manner in which it is provided with openings for the reception of attaching screws and the clamping screw.

Still another object of my invention resides in forming the frame of the clamp of sheet metal and particularly in the manner in which the openings in the sheet metal stamping are formed, which openings include the sight opening for the scale readings, the screw openings and the clamping screw opening.

Yet another object of my invention resides in the manner of forming this sheet metal frame from a single stamping and bending it into substantially rectangular shape and in mounting thereon the yoke which carries the clamping screw.

These and other objects of my invention will be apparent from a perusal of the following specification when taken in connection with the accompanying drawings, wherein:

Fig. 1 is a perspective view of a portion of the two rod sections of an extensible leveling rod, showing my improved clamp in position.

Fig. 2 is a vertical section with one of the rod sections removed and showing the clamping frame attached to the other rod section.

Fig. 3 is a detached perspective view of the sheet metal frame itself.

Fig. 4 is a perspective view of the yoke or bridge member unconnected with the frame or sleeve.

Fig. 5 is a sectional view transversely through the leveling rod showing the sleeve enclosing and embracing the rod section 10.

Fig. 6 is a plan view of the sheet metal blank cut to form and just before the same is bent into rectangular shape as shown in Fig. 3, and Fig. 7 of the drawing is a modified form of the blank.

Referring now to the drawings in detail, the rod is formed in two sections 10 and 12 in the manner common to extension leveling rods, said sections being adapted adjustably to carry in practice a target, which is well known in the art and, therefore, is not shown in the drawing. The upper section 12 may be termed the movable section, the lower section 10 being designed to rest upon the ground or the support. Ordinarily the front of the stationary section 10 has scale markings. The present invention relates particularly to the construction of a clamp for adjustably holding the two rod sections in relative positions of adjustment as shown for instance in Figure 1 of the drawings. Broadly considered, this clamp includes a sleeve or frame attached to one of the rod sections and adapted to surround the other rod section which slides through it and the frame or sleeve carries a bracket or a yoke in which is mounted a clamping screw so that by turning the clamping screw in the yoke, the inner end of the screw will be projected toward that section of the rod which slides through the sleeve and will firmly grip and clamp the rod section in any position of adjustment relative to the other rod section. The particular features of my invention, in respect to this clamp, reside in its simple and economical construction and particularly in the manner in which it is made from a sheet metal stamping into the form of a sleeve, and the manner in which the yoke is mounted on the sleeve so as to hold the clamping screw while permitting the screw to pass through an aperture in the sleeve to clamp the rod section as desired. Referring now more particularly to the clamp, the frame, which is shown in perspective in Figure 3 of the drawings, is formed of heavy sheet metal, or other desired material, from the blank form shown in Figure 6 of the drawings. For instance in my particular method of forming this frame or sleeve, I stamp out of a piece of sheet metal the blank shown in Figure 6. During this stamping operation the blank 14 is also stamped with a relatively large opening 16 for exhibiting the scale markings and preferably, simultaneously, the blank is also stamped with the clamp screw opening 18 and a plurality of smaller openings 24 for accommodating screws 26 by which the frame may be secured to the upper section 12 of the rod as shown in Figure 5. In addition I also provide the blank with openings 51 which may be in the form of screw openings or may be smaller openings for receiving rivets. These screw or rivet openings 51 are preferably located above and below that portion of the blank in which the clamping screw opening 18 is formed. I also provide the blank with openings 52 at a portion 55 of the blank which is disposed on the opposite side of the opening 16. And these openings 52 are disposed opposite the screw openings 51 and are preferably large enough to receive a screw driver or other turning instrument. This relation of these openings 51 and 52 is clearly illustrated in Figure 3 of the drawings and shows how the openings 52 come opposite the screw openings 51 so that, as shown in Figure 2 of the drawings, when it is desired to secure the yoke member, hereinafter described, to the sleeve, the screw driver may be inserted through the openings 52 to engage the screws.

In the further method of forming and assembling my improved blank, after the same is formed as shown in Figure 6, it is then bent into substantially rectangular shape as shown in Figure 3.

The yoke or bracket 30, shown in perspective in Figure 4, has a main body portion formed with lateral off-sets which in turn are provided with feet 32 designed to bear upon that side of the wall of the frame in which the clamping screw hole 18 is formed. These feet either have threaded holes 50 formed in them to register with the screw openings 51 or are provided with rivet openings so that the yoke may be riveted to the frame at this point. In this manner the yoke is held in position upon the frame in a rigid manner. The yoke, at an intermediate point, is formed with a threaded bore preferably in the form of a hollow boss 42 which, when the yoke is assembled, comes opposite the clamping screw opening 18 of the sleeve. A clamping screw 22, having an outer end threaded adjustably to engage the threads of the boss 42, is mounted so that its inner nose extends through clamping screw opening 18 of the sleeve and this screw is provided with a turning means in the shape of a wheel 40 by which the screw may be rotated. It will be noted that the yoke 30 bridges this wheel so that as a result of this construction, the wheel is protected from injury or from being struck by objects. Furthermore, the hollow boss 42 prevents dirt from having access to the threads of the screw and provides a housing in which grease may be retained for lubricating the screw.

Between the nose of the screw and the side of the rod section 10 there is interposed a leafspring 44. This is for preventing the nose of the screw from indenting the wood of which the rod is formed, and it also increases the area available for clamping engagement on the rod section. The spring has extensions 46 at each end bent at right angles to the body of the spring. These engage the upper and lower edges of the frame and prevent the spring from moving longitudinally relatively to the frame. By preference the extensions 46 are sprung a trifle so that they will converge slightly and grip the upper and lower edges of the side wall of the frame. Thus the spring is held somewhat after the manner of a clip, with the result that the spring will retain itself upon the frame even though the rod section is not present. As the spring is resilient it can, of course, be readily pulled off, and it can be positioned by merely pressing it in place, but this construction forms a simple and effective means for keeping the spring in position in the frame and simplifies the act of assembly.

In lieu of forming the blank, as shown in Figure 6 of the drawings, I may form the same as shown in Figure 7, wherein the opening 16 is placed not intermediate the blank as shown in Figure 6, but adjacent the end. In this modification the screw openings 24 are placed correspondingly at the other end of the blank. In addition, in forming this blank the opposite ends of the same are notched as at 18′ so that when the blank is formed into sleeve-like shape the notches 18′ will register to form the clamping screw opening. In this instance the marginal strips or opposite ends of the blank where not notched, are made or provided with screw or rivet openings 26′ to receive the bridge member so that in this manner, when the bridge or yoke 30 is assembled to the sleeve, it will not only be mounted thereon but the rivet or screw fastenings 26′ will serve to hold the sleeve ends together.

From the foregoing description it will be evident that in my clamp the form of the component elements is extremely simple and the number of pieces is reduced to the minimum. It will also be evident that the process of manufacturing is greatly simplified, as the blank 14 can be struck out of a single piece of metal while the various openings are simultaneously formed therein so that the only machine work required is that of threading the clamping screw and the chambered housing.

It will also be evident that after my device has been assembled, there is no danger of parts working loose or falling out when in use. From a practical standpoint, there are no parts to become loose and this is of great importance when it is borne in mind that this form of device is intended to be used in the field where repairs are next to impossible.

Having thus described my invention what I claim as new and desire to secure by Letters Patent is:

1. The process of forming a sleeve blank for a clamp for a leveling rod which consists in cutting out a substantially rectangular blank of sheet metal while simultaneously cutting out a relatively large opening within the body of the metal to provide an opening to exhibit the scale markings and providing the other portions of the body of sheet blank with screw openings to receive the fastening screws for attaching the finished blank to the leveling rod.

2. The process of forming a clamp for a leveling rod which consists in cutting out a substantially rectangular blank of sheet metal while simultaneously cutting out a relatively large opening within the body of the metal to provide an opening to exhibit the scale markings and providing the other portions of the body of sheet blank with screw openings to receive the fastening screws for attaching the finished blank to the leveling rod, bending the blank into rectangular formation whereby the relatively large opening will appear in the wall opposite that portion of the blank in which the attaching screw openings are formed.

3. The process of forming a clamping member for a leveling rod which comprises stamping out a substantially rectangular blank of sheet metal and forming the blank intermediate its length with a relatively large scale mark sight opening, and forming the blank to one side of said sight opening with a clamping screw opening disposed substantially intermediate the width of the blank and with openings on each side thereof for the reception of fastening screws adapted to engage a yoke, providing the corresponding portion of the blank on the other side of the sight opening with relatively larger openings adapted to register with the screw openings when the blank is formed into a hollow rectangle, and forming the opposite ends of the blank with additional screw openings for the reception of fastening screws when the blank is bent into rectangular sleeve-like shape whereby the blank may be screwed to a rod section.

4. A blank for a leveling rod clamping frame consisting of a rectangular blank of sheet metal having intermediate its ends a relatively large sight opening and provided to one side of said opening intermediate its width with a relatively smaller clamping screw opening and with screw openings on each side of the clamping screw openings, said blank being provided, at a portion correspondingly disposed on the opposite side of said sight opening, with screw driver receiving openings correspondingly disposed with respect to the screw receiving openings first mentioned, and said blank having its opposite ends provided with additional openings for the reception of fastening screws.

5. A frame having a clamp for a leveling rod comprising a hollow rectangular shaped sleeve of sheet metal having a first wall provided with a relatively large sight opening, the opposite wall being formed by abutting ends of sheet metal and provided adjacent said abutting ends with screw receiving openings, one of the walls between said first mentioned opposed walls being provided with a clamping screw opening intermediate its height and provided with screw openings on each side thereof, the wall opposite that wall having the clamping screw opening, being provided with openings opposed and in registration with the screw receiving openings on each side of the corresponding screw openings whereby to permit the insertion of a screw driver through said last mentioned opening to facilitate the fastening of a yoke to said frame.

In witness whereof, I have hereunto subscribed my name.

ADOLPH LANGSNER.